(12) United States Patent
Parsons et al.

(10) Patent No.: US 8,960,401 B2
(45) Date of Patent: Feb. 24, 2015

(54) SYSTEM INTEGRATION

(75) Inventors: Stuart William Parsons, Portsmouth (GB); Ronald John Freeman, Southhampton (GB); Clive Phillips, Waterlooville (GB)

(73) Assignee: BAE SYSTEMS plc (GB)

( * ) Notice: Subject to any disclaimer, the term of this patent is extended or adjusted under 35 U.S.C. 154(b) by 0 days.

(21) Appl. No.: 13/821,535

(22) PCT Filed: Sep. 1, 2011

(86) PCT No.: PCT/GB2011/051643
§ 371 (c)(1),
(2), (4) Date: Mar. 7, 2013

(87) PCT Pub. No.: WO2012/032332
PCT Pub. Date: Mar. 15, 2012

(65) Prior Publication Data
US 2013/0170934 A1 Jul. 4, 2013

(30) Foreign Application Priority Data

Sep. 8, 2010 (EP) ..................................... 10275092
Sep. 8, 2010 (GB) .................................. 1014937.5

(51) Int. Cl.
*B65G 13/12* (2006.01)
*B60P 1/52* (2006.01)
(Continued)

(52) U.S. Cl.
CPC . *B60P 1/52* (2013.01); *B23K 37/00* (2013.01); *B23K 37/0408* (2013.01); *B23Q 1/032* (2013.01); *B23Q 1/40* (2013.01); *B23Q 5/22* (2013.01); *B23Q 2240/002* (2013.01)
USPC ...................................... 193/35 SS; 198/782

(58) Field of Classification Search
CPC ..... B65G 13/12; B65G 13/065; B65G 39/025
USPC ..................... 198/782; 193/35 SS; 414/535
See application file for complete search history.

(56) References Cited

U.S. PATENT DOCUMENTS 2,534,868 A 12/1950 Johnston
2,813,642 A 11/1957 Fisher
(Continued)

FOREIGN PATENT DOCUMENTS

DE 35 26 634 A1 2/1987
DE 10 2009 030 145 A1 12/2009
(Continued)

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) dated Mar. 21, 2013, issued in corresponding International Application No. PCT/GB2011/051643. (6 pages).
(Continued)

*Primary Examiner* — Leslie A Nicholson, III
(74) *Attorney, Agent, or Firm* — Finch & Maloney PLLC

(57) ABSTRACT

A large and massive panel is maneuvered and supported by a work piece support which has an upper horizontal work piece support surface for receiving the panel in extended surface-to-surface contact. An array of apertures is provided in the work piece support surface, beneath same of which are provided low friction bearing elements moveable between a raised, load-bearing position in which the panel can be slid onto the work piece support and a retracted position in which the panel is left in extended surface to surface contact with the work piece support.

18 Claims, 2 Drawing Sheets

(51) Int. Cl.
  *B23K 37/00* (2006.01)
  *B23K 37/04* (2006.01)
  *B23Q 1/03* (2006.01)
  *B23Q 1/40* (2006.01)
  *B23Q 5/22* (2006.01)

(56) References Cited

U.S. PATENT DOCUMENTS

| | | |
|---|---|---|
| 3,673,920 A | 7/1972 | Wahlen et al. |
| 3,782,569 A | 1/1974 | Montgomery |
| 3,807,035 A | 4/1974 | Moorman et al. |
| 4,036,345 A * | 7/1977 | Webb .................. 193/35 SS |
| 4,347,794 A * | 9/1982 | Nordstrom ............ 108/57.15 |
| 5,088,585 A | 2/1992 | Lambert |
| 5,328,540 A * | 7/1994 | Clayton et al. ............ 156/285 |
| 5,464,086 A * | 11/1995 | Coelln .................. 193/35 SS |
| 5,915,515 A | 6/1999 | Blair |
| 6,019,211 A * | 2/2000 | Masciarelli, Jr. ......... 198/345.1 |
| 6,401,900 B1 * | 6/2002 | Masciarelli, Jr. ....... 193/35 MD |
| 6,786,318 B1 * | 9/2004 | Pace et al. ............... 193/35 SS |
| 2008/0056871 A1 | 3/2008 | Morgan et al. |

FOREIGN PATENT DOCUMENTS

| | | |
|---|---|---|
| EP | 0527114 A1 | 2/1993 |
| FR | 1 512 551 A | 2/1968 |
| FR | 2 566 750 A1 | 1/1986 |
| GB | 1 303 035 A | 1/1973 |
| JP | 2000071085 A | 3/2000 |
| WO | 9946535 | 9/1999 |

OTHER PUBLICATIONS

International Search Report (PCT/ISA/210) issued on Dec. 21, 2011, by the European Patent Office as the International Searching Authority for International Application No. PCT/GB2011/051643.
European Search Report for EP 11275092 dated Feb. 17, 2011.
United Kingdom Search Report for GB 1014937.5 dated Jan. 6, 2011.

* cited by examiner

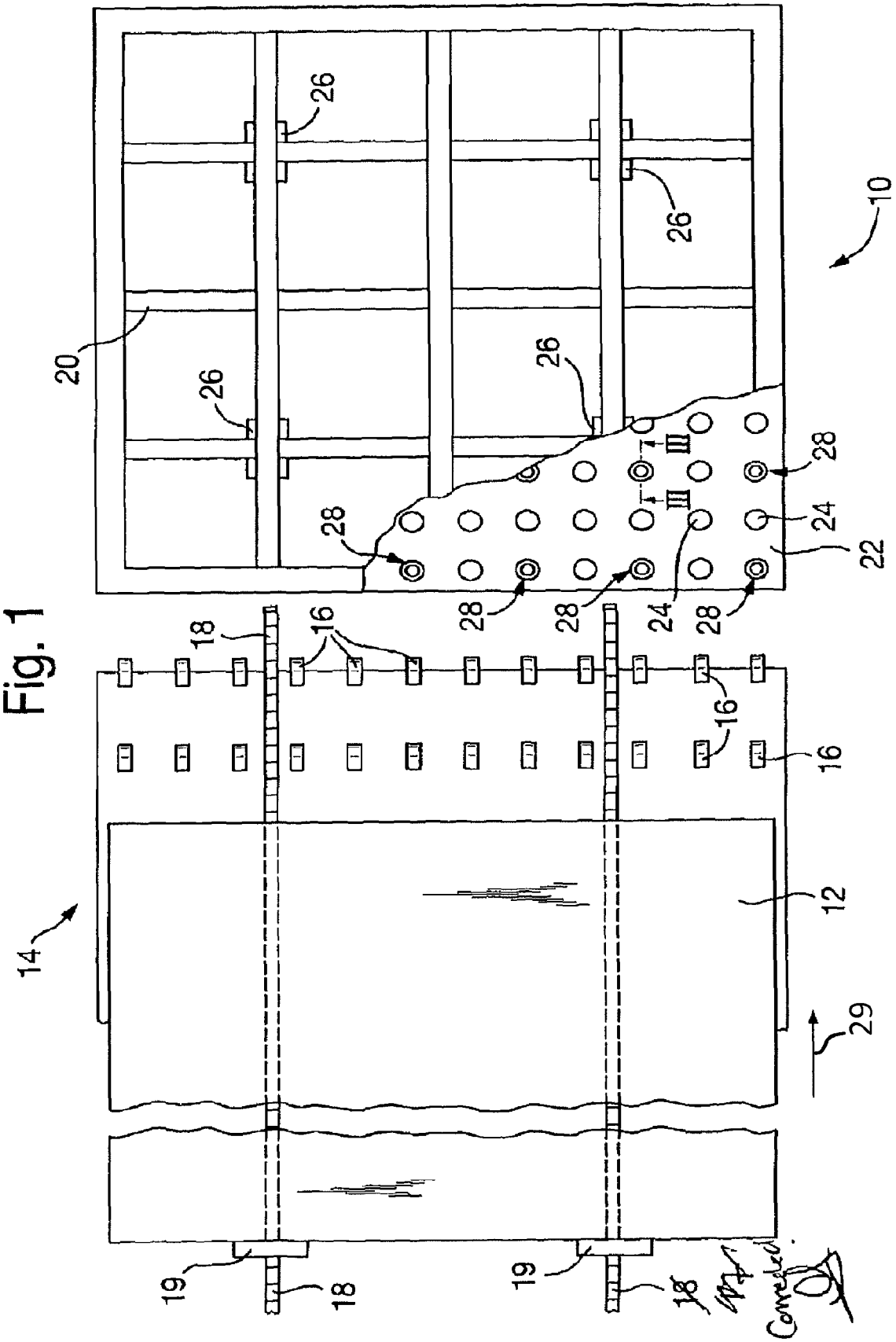

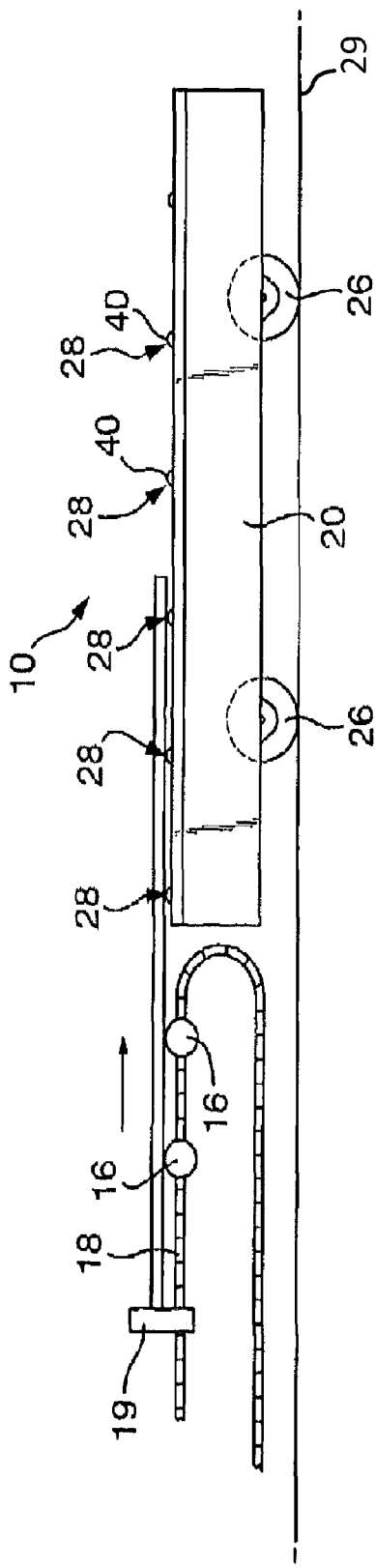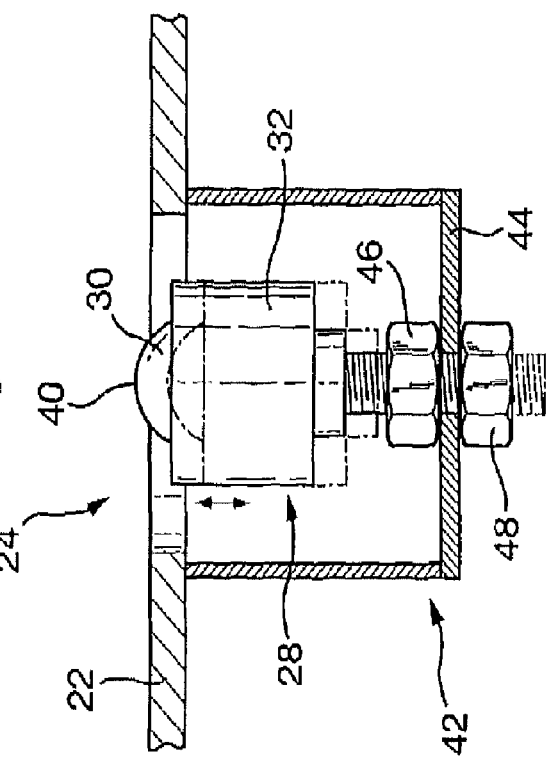

SYSTEM INTEGRATION

This invention relates to apparatus and methods for maneuvering and support of panels, and in particular, but not exclusively, to such apparatus and methods for handling massive panels of the type used, for example, in the construction of naval vessels and other large structures.

The term 'panel' herein is used broadly to mean an item having a generally flat surface element with or without the attachment of reinforcing or other members to one or both sides.

In the manufacture of naval vessels we have previously fabricated large structures such as the hull, bulkheads and other internal structure from metal panels each made up of a number of smaller plates or sheets welded together in a seam welder. Once sufficient of the plates have been welded together in this way, the resultant panel is delivered to the out-feed station of the seam welder. From there the panel is lifted by moving into position a crane with suction pads which lowers into contact with the panel, applies suction, lifts the panel vertically and then translates it generally horizontally to overlie an in-feed pallet, with the crane then lowering the panel onto the in-feed pallet, releasing the suction and moving back out of the way.

This approach has been used and is effective but has significant drawbacks. For manufacturing efficiency, and particularly with large naval vessels, the size of the panels, and thus their weight, is increasing and it becomes difficult, and therefore expensive if not impossible, to provide a crane which is capable of performing the above operations. Also the crane must be operated by a specialist crane operator who may be otherwise occupied on tasks elsewhere and so the fabrication and assembly may be interrupted, causing a production bottleneck, until the crane operator arrives. In addition, there are considerable potential hazards when lifting and maneuvering these panels which may weigh typically 55 tonnes or so, and measure typically 13 meters×12 meters. Health and Safety legislation can also require time-consuming precautions to be taken before the panel is lifted, such as the welding on of lifting lugs.

Accordingly, we have designed a method and apparatus which obviate the need for a crane with the attendant disadvantages described above, and which allow a large and weighty panel to be shifted from an upstream work station onto an in-feed pallet or other work piece support in an effective and safe manner.

Therefore, in one aspect, this invention provides a method of maneuvering and supporting a panel, which includes the steps of:

providing a work piece support having a generally horizontal work piece support surface for receiving said panel in extended surface to surface contact, and a plurality of relatively low friction bearing members at spaced locations across said work piece support surface, each said bearing member being movable between a raised position in which it projects above said work piece support surface and a lowered position in which it is level with or below said work piece support surface;

raising at least some of said bearing members;

advancing said panel generally horizontally across and over said work piece support surface whereby the panel is at least partially supported by said bearing members and slides relative thereto, and lowering said bearing members so that said panel is left supported in extended surface contact with said work piece support surface.

In this arrangement, instead of requiring a crane to pick up the panel from an upstream location, transfer it and lower it onto a work piece support, the panel can simply be shunted horizontally from the upstream station by applying a horizontal force to the panel. This force can be provided by equipment associated with the upstream station, or stand alone equipment. Furthermore, the provision of extended surface to surface contact gives a robust structural support and good heat transfer properties which greatly facilitate fabrication. Compared to arrangements in which a panel passes down a fabrication/assembly line supported only by wheels contacting the underside of the panel, the above arrangement provides stable extended surface contact down the whole line. The term 'extended surface contact' is used to mean that, in general, at least 40% of the lower surface of the panel element is in surface contact with the work piece support surface, and in many cases this will be at least 70% and ideally at least 90%. Depending on the elastic deflection of the panel as it passes over the bearing members and the spacing of the bearing members the panel may be supported solely by the bearing elements, or it may be partially supported by contact with the work piece support surface at points between the bearing elements.

Preferably, after performing operations as necessary on the panel it may be transferred off the work piece supported by:

raising said bearing members to move the panel at least partially out of contact with the work piece support surface, and moving said panel horizontally off the work piece support whilst at least partially supported by said bearing members.

In another aspect, this invention provides a work piece support apparatus arranged to be disposed generally horizontally in use and including:

a generally horizontal work piece support surface for receiving a panel in extended surface to surface contact, a plurality of bearing members at spaced locations across said work piece support surface, each said bearing member being movable between a raised position in which at least a part of a bearing surface projects above said work piece support surface, and a lowered position in which said bearing surface is level with or below said work piece support surface.

Whilst the invention has been described above, it extends to any inventive combination or sub-combination of the features set out in the description, claims or drawings.

The invention may be performed in various ways, and, by way of example only, a specific embodiment will now be described, reference being made to the accompanying drawings in which:

FIG. 1 is a schematic top plan view of a work piece support in accordance with this invention disposed alongside a seam welder out-feed station to receive a seam welded panel;

FIG. 2 is a side elevation on the work piece support of FIG. 1, and

FIG. 3 is a detailed view taken on lines III-III of FIG. 1 showing one of the roller low friction elements.

The work piece support 10 disclosed in the drawings is intended to receive and support a panel in a horizontal direction from an upstream work station such as a seam welder. In this particular arrangement the work piece support 10 is a movable pallet which is moved down an assembly line 29 with the panel 12 supported on the work piece support being worked on e.g. to weld stiffeners such as reinforcing members, frame structures etc to fabricate a structure prior to further working.

Referring to FIG. 1, the panel 12 is shown on the out-feed station 14 of the seam welder 12. The out-feed station 14 comprises an array of upwardly facing wheels 16 along with two conveyor chains 18, 16 which have pusher plates 19 which engage the trailing edge of the panel as it leaves the seam welder and push it onto the out-feed station and thence towards the work piece support 10.

The work piece support 10 comprises a horizontal frame 20 on the upper horizontal plane of which is located a work piece support plate 22 with an array of apertures 24. The frame is supported on wheels 26 for movement down the fabrication/assembly line 29. The apertured support plate 22 is designed to receive the panel and, if required, the panel can be clamped to the work piece support plate by clamping using a vacant aperture 24. In some instances gravity alone may be sufficient to hold the panel stationary. The apertured support plate 22 is in extended surface contact with the panel 12 both to provide surface support and also to provide good heat conduction to dissipate heat created during welding of the panel work piece.

Underneath selected apertures 24 in the work piece support sheet 22 are located low friction roller elements 28. These roller elements comprise roller balls 30 suitably supported in a bearing cup 32 so that they can rotate in any direction around the centre of the ball. The roller elements 28 are movable between a raised position in which their upper contact dome surfaces 40 are spaced above the plane of the upper surface of the work piece support plate 22, as shown in solid lines in FIG. 3, to a lowered position in which they are below the surface of the work sheet, shown in dotted lines. For this purpose, the roller elements 28 are each mounted in respective cylindrical recessed housings 42 secured to the underside of the support plate 22 by welding and which project below the surface of the work piece support plate 22. Secured to the base 44 of each recessed housing is a nut 46 into which screws a bolt 48, to the upper end of which is attached said roller element 28. In this fashion, by rotating the bolt 48, the roller element 28 can be moved between raised and lowered positions. In the embodiment as shown, the raising and lowering of the roller elements is done by means of a pneumatic socket wrench or the like. In other embodiments (shown in dashed lines) a permanent drive actuator 50 may be associated with each roller element operable to raise and lower it in response to a control signal 52.

In use, when the seam welder is ready to discharge a seam welded panel, the work piece support is positioned adjacent the out-feed station 14 with the plane of the work piece support 10 being generally coplanar with that of the seam welded panel as seen in FIG. 2. The work piece support 10 is locked against movement relative to the ground and then the roller elements 28 are each wound up using the pneumatic socket wrench so that they each sit proud of the surface as shown in FIG. 2. The work piece support is now ready to receive the panel as it is pushed laterally from the seam welder out-feed station. If required, the pusher plates of the out-feed station may have extensions thereon so that the panel is pushed fully onto the work piece support. Alternatively, clamps may be applied to the leading edge of the panel so that it may be winched onto the work piece support. As the panel transfers onto the work piece support, its weight is supported by the roller elements 28 which allow it to glide at a height spaced clear of the work piece support. When the panel has been fully shifted across, the roller elements 28 are then lowered so that the panel is now supported by the work piece support surface. As noted above, if required, clamps may be applied to clamp the panel to the work piece support through using additional apertures. The panel can now have stiffeners etc welded to it and then be transported to successive work stations on the fabrication/assembly line 29. When it is required to remove the panel from the work piece support, the roller elements 28 may be raised again using the pneumatic socket wrench so that the panel is supported by the roller elements 28 and then a lateral force applied to shift the panel 12 off the work piece support.

As noted, this arrangement has significant technical advantages over the arrangement it replaces because the need for any lifting mechanism is removed. This means that the capital equipment required during assembly is reduced with a considerable cost saving and also as this specialist equipment is not required, with associated requirement for a specialist operator, the arrangement disclosed leads to a leaner and more cost effective process because it saves time and provides a more direct flow for materials.

The invention claimed is:

1. A method of maneuvering and supporting a panel, which comprises:
   providing a work piece support having a generally horizontal work piece support surface for receiving said panel in extended surface to surface contact, and a plurality of relatively low friction bearing members at spaced locations across said work piece support surface, each said bearing member being movable between a raised position in which it projects above said work piece support surface and a lowered position in which it is level with or below said work piece support surface, the work piece support surface further comprising a continuous sheet including a plurality of apertures across its surface, wherein select ones of said apertures are each aligned with a corresponding one of the bearing members, such that said corresponding bearing member projects therethrough when in the raised position, and other ones of said apertures are not aligned with any bearing members so as to be vacant in both the raised and lowered positions;
   raising at least some of said bearing members;
   advancing said panel generally horizontally across and over said work piece support whereby the panel is at least partially supported by said bearing members and slides relative thereto;
   lowering said bearing members so that said panel is left supported in extended surface contact with said work piece support surface; and
   moving the work piece support down an assembly line with the panel supported on the work piece support surface.

2. A method according to claim 1, which comprises subsequently removing said panel by:
   raising said bearing members to move the panel at least partially out of contact with the work piece support surface; and
   removing said panel horizontally whilst at least partially supported by said bearing members.

3. A method according to claim 1, further comprising locking the work piece support against movement relative to a ground surface.

4. A method according to claim 1, wherein the work piece support surface is heat conductive.

5. A method according to claim 1, the method further comprising clamping the panel to the work piece support surface using at least one of the vacant apertures.

6. A work piece support apparatus arranged to be disposed generally horizontally when in use and comprising:
   a generally horizontal work piece support surface for receiving a panel in extended surface to surface to contact, the support surface being a continuous sheet including a plurality of apertures; and
   a plurality of bearing members at spaced locations across said work piece support surface, said bearing members are aligned with select ones of said apertures and adapted to project therethrough, and other ones of said apertures are not aligned with any bearing members;

each said bearing member being movable between a raised position in which at least a part of the bearing surface projects above said work piece support surface through a corresponding one of the select apertures, and a lowered position in which said bearing surface is level with or below said work piece support surface.

7. A work piece support apparatus according to claim 6, wherein said work piece support surface is heat conductive.

8. A work piece support apparatus according to claim 7, wherein the support frame comprises:

wheel members to allow the support frame to be moved relative to a ground surface.

9. A work piece support apparatus according to claim 6, wherein each bearing member comprises:

a spherical bearing element captively held in a cup element for rotation.

10. A work piece support apparatus according to claim 6, wherein each bearing member is supported in a recessed housing beneath an associated aperture, each recessed housing secured to an underside of the work piece support surface.

11. A work piece support apparatus according to claim 10, wherein said bearing member is threadedly supported in said recess for being rotated to move between its raised and lowered positions.

12. A work piece support apparatus according to claim 11, wherein a portion of said bearing member projects below said recess to be externally accessible in use by a tool for rotating said bearing member.

13. A work piece support apparatus according to claim 10, comprising:

a remotely operable actuator for raising and lowering the bearing member.

14. A work piece support apparatus according to claim 6, wherein each of said other apertures not aligned with any bearing member is vacant in both the raised and lowered positions.

15. A work piece support apparatus according to claim 6, wherein the work piece support apparatus supports massive multi-tonne multi-meter panels having a weight to size ratio of 0.3 tonnes/meter$^2$.

16. A work piece support apparatus according to claim 6, wherein the work piece support apparatus supports massive multi-tonne multi-meter panels.

17. A work piece support apparatus according to claim 6, wherein the work piece support apparatus supports panels having a weight in the range of 55 tonnes and a size in the range of 13 meters×12 meters.

18. A work piece support apparatus according to claim 6, wherein the work piece support apparatus supports massive panels for a naval vessel or other large structure.

\* \* \* \* \*